US012789760B1

(12) United States Patent
Lehman

(10) Patent No.: US 12,789,760 B1
(45) Date of Patent: Nov. 10, 2026

(54) ATTACHABLE LEVELING SYSTEM

(71) Applicant: Lippert Components Manufacturing, Inc., Elkhart, IN (US)

(72) Inventor: Matthew Curtis Lehman, Sturgis, MI (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 242 days.

(21) Appl. No.: 18/822,173

(22) Filed: Aug. 31, 2024

Related U.S. Application Data

(60) Provisional application No. 63/536,235, filed on Sep. 1, 2023.

(51) Int. Cl.
*B60S 9/12* (2006.01)

(52) U.S. Cl.
CPC .................................... *B60S 9/12* (2013.01)

(58) Field of Classification Search
CPC .......... B60S 9/12; B66F 3/46; B66F 9/07559; B66F 9/22; B66F 7/08; B66F 7/20; B66F 1/00
See application file for complete search history.

(56) References Cited

U.S. PATENT DOCUMENTS 2,161,136 A * 6/1939 Conradson ................ B60S 9/06 254/133 R
4,055,329 A * 10/1977 Hammond ................ B66F 3/12 254/424
4,544,134 A * 10/1985 Mitchell ................... B66F 3/24 254/133 R
4,635,904 A * 1/1987 Whittingham ............ B60S 9/08 192/56.62
5,067,692 A * 11/1991 Nudd ........................ B60D 1/66 254/420
5,282,605 A * 2/1994 Sauber ................... B60D 1/665 254/420

(Continued)

FOREIGN PATENT DOCUMENTS

DE 102009047458 A1 * 6/2011 ............ B62D 21/12
JP 2014113894 A * 6/2014

OTHER PUBLICATIONS

DE-102009047458-A1 English Translation (Year: 2011).*
JP-2014113894-A English Translation (Year: 2014).*

*Primary Examiner* — Michael T. Walsh
(74) *Attorney, Agent, or Firm* — NIXON & VANDERHYE P.C.

(57) ABSTRACT

A vehicle leveling system includes a jack and a frame engaging bracket that mounts to a first frame rail of a hosting vehicle. The jack includes a lower portion that is extendable from an upper portion. The frame engaging bracket includes an intermediate portion, a support arm, and a securement tab. The support arm extends from a first side of the intermediate portion and the securement tab extends from a second side of the intermediate portion. The support arm defines a supporting surface configured to engage a bottom surface of the first frame rail, and the securement tab is configured to engage an adjacent structure of the host vehicle. In a more particular embodiment, the leveling system includes a second jack and a second frame engaging bracket that mount to a second frame rail of the hosting vehicle.

20 Claims, 15 Drawing Sheets

(56) References Cited

U.S. PATENT DOCUMENTS

| | | | | |
|---|---|---|---|---|
| 6,302,381 | B1 * | 10/2001 | Roll | B60D 1/665<br>254/424 |
| 10,821,944 | B2 * | 11/2020 | Lehman | B60S 9/04 |
| 11,505,440 | B1 * | 11/2022 | Christensen | B66F 13/00 |
| 2015/0041741 | A1 * | 2/2015 | Hyslop | B60S 9/04<br>254/422 |

* cited by examiner

ATTACHABLE LEVELING SYSTEM

RELATED APPLICATIONS

This application claims the benefit of priority to U.S. Provisional Patent Application No. 63/536,235, which was filed on Sep. 1, 2023 by the same inventor and is incorporated herein by reference in its entirety.

BACKGROUND OF THE INVENTION

Field of the Invention

This invention relates generally to leveling systems for vehicles, and more particularly to leveling systems configured for attachment to a vehicle frame.

Description of the Background Art

Recreational vehicles (RVs) are popular for travel and camping. Increasingly, non-recreational utility vehicles are being converted into RVs. For example, cargo vans, typically used for commercial applications, are a popular vehicle for RV conversion. When converting general-use vehicles to an RV, providing a leveling system for the vehicle should be considered, because most general-use vehicles do not come equipped with one.

Sometimes stand-alone jacks can be placed under a converted RV to lift the RV for leveling purposes. This is disadvantageous, however, because the jacks need to be stored (e.g., in a vehicle compartment) when not in use, and some work is required to place and extend the jacks for leveling. One solution to these problems is to drill holes into the frame of the vehicle and attach jack(s) using these newly-drilled holes. Unfortunately, this solution is also disadvantageous, because drilling into "no-drill zones" in a frame can void a manufacturer's warranty and/or create a safety hazard, for example, by weakening the frame.

SUMMARY

The present invention overcomes the problems associated with the prior art by providing a system and method for attaching jacks to a vehicle frame, without drilling holes in the vehicle frame. In addition, the invention facilitates the avoidance of obstructions encountered during attachment of jacks to a vehicle.

A vehicle leveling system for attachment to a vehicle is disclosed. An example vehicle leveling system includes a first jack, a mount, a first frame engaging bracket, a second frame engaging bracket, a spacer and a fastener. The first jack includes an upper portion and a lower portion. The lower portion is extendable with respect to the upper portion. The mount is fixed to the upper portion of the jack. The first frame engaging bracket can include an intermediate portion, a support arm, and a securement tab. The support arm can extend from a first side of the intermediate portion and can be configured to engage a bottom surface of the vehicle frame. The securement tab can be disposed to facilitate securement of the first frame engaging bracket to an adjacent structure of the vehicle. The second frame engaging bracket can include an intermediate portion, a support arm, and a securement tab. The support arm can extend from a first side of the intermediate portion and can be configured to engage the bottom surface of the vehicle frame. The securement tab can be disposed to facilitate securement of the first frame engaging bracket to an adjacent structure of the vehicle. The spacer can be disposed between the mount and the second frame engaging bracket, and the fastener can couple the first frame engaging bracket, the mount, the spacer, and the second frame engaging bracket together. Optionally, the securement tab of the first frame engaging bracket can include a substantially vertical planar surface defining at least one fastener receiving aperture.

In an example vehicle leveling system, the spacer can be an elongated structure that includes a first end and a second end. The first end can be disposed to abut a first side of the mount, and the second end can be disposed to abut the second frame engaging bracket. The first frame engaging bracket can define a first aperture, the second frame engaging bracket can define a second aperture, and the mount can define a third aperture. The first spacer can define a bore, and the fastener can be disposed through the first aperture, the second aperture, the third aperture, and the bore.

An example vehicle leveling system can additionally include a second spacer and a second fastener. The second spacer can be an elongated structure having a first end and a second end, and can define a bore. The second spacer can be disposed between the mount and the second frame engaging bracket. The first frame engaging bracket can define a fourth aperture, the second frame engaging bracket can define a fifth aperture, and the mount can define a sixth aperture. The second fastener can be disposed through the fourth aperture, the fifth aperture, the sixth aperture, and the bore of the second spacer.

In an example vehicle leveling system, the first aperture can be an elongated slot that facilitates horizontal adjustment of the first frame engaging bracket with respect to the first fastener. The second aperture can also be an elongated slot that facilitates horizontal adjustment of the second frame engaging bracket with respect to the first fastener. The mount can include an upright surface disposed to abut a sidewall of a frame of the vehicle, and the third aperture can be substantially circular. The first frame engaging bracket and the second frame engaging bracket can thereby be adjusted to snuggly engage the frame of the vehicle.

In an example vehicle leveling system, the first jack can be a hydraulic jack, and the upper portion of the first jack can include a hydraulic line connector. The first jack can also include a hydraulic fluid line coupled to the hydraulic line connector. At least a portion of the hydraulic fluid line can be disposed between the first frame engaging bracket and the second frame engaging bracket.

In an example vehicle leveling system, the spacer can extend along a first axis. The securement tab can define a fastener receiving aperture that extends therethrough, along a second axis. The first axis can be perpendicular to the second axis.

In an example vehicle leveling system, at least one of the intermediate portion of the first frame engaging bracket and the intermediate portion of the second frame engaging bracket can defines an access passageway. Tools can pass through the access passageway to access a space, between the first frame engaging bracket and the second frame engaging bracket, from outside of the first frame engaging bracket and the second frame engaging bracket. The passageway can be a relatively large through-hole passing through the intermediate portion of the first frame engaging bracket.

In an example vehicle leveling system, the intermediate portion and the support arm of the frame engaging bracket(s) can be substantially flat and aligned with a first plane. The securement tab can also be substantially flat and aligned with a second plane. The first plane can be perpendicular to the second plane. The intermediate portion, the support arm, and the securement tab are integral parts of a single piece of plate metal. In a particular example, the support arm can further define a first side surface extending upward from a first end the supporting surface. The first side surface can be disposed to engage a side wall of the vehicle frame.

In an example vehicle leveling system, the mount can include a substantially flat first upright surface, and the first upright surface can abut the intermediate portion of the first frame engaging bracket. The mount can include a substantially flat second upright surface perpendicular to the first upright surface, and the second upright surface can be disposed to abut a sidewall of the frame of the vehicle.

In an example vehicle leveling system, the upper portion of the first jack can include a hydraulic cylinder barrel. The mount can include a section of metal C-channel having a first sidewall, a second sidewall, and an intermediate sidewall interposed between the first sidewall and the second sidewall. The first sidewall can be attached to the hydraulic cylinder barrel. The second sidewall can also be attached to the hydraulic cylinder barrel. The first sidewall can be substantially parallel to the second sidewall, and the intermediate sidewall can be substantially perpendicular to the first sidewall and the second sidewall. The first upright surface can be an integral part of the first sidewall of the section of metal C-channel, and the second upright surface can be an integral part of the intermediate sidewall of the section of metal C-channel.

The example vehicle leveling system can additionally include a second spacer and a second fastener. The first frame engaging bracket can define a first aperture and a second aperture. The first sidewall of the section of metal C-channel can define a third aperture and a fourth aperture. The second sidewall of the section of metal C-channel can define a fifth aperture and a sixth aperture. The second frame engaging bracket can define a seventh aperture and an eighth aperture. The first spacer can be an elongated structure defining a first bore, and the second spacer can be an elongated structure defining a second bore. The first fastener can be disposed through the first aperture, the third aperture, the fifth aperture, the first bore, and the seventh aperture. The second fastener can be disposed through the second aperture, the fourth aperture, the sixth aperture, the second bore, and the eighth aperture. Thus, the first and second fasteners hold the first frame engaging bracket, the mount, the spacers, and the second frame engaging bracket together.

Optionally, the first and/or second frame engaging bracket(s) can be formed from a single piece of substantially flat metal having a bend formed therein between the securement tab and the intermediate portion. As another option, the second frame engaging bracket can be geometrically identical to the first frame engaging bracket.

An example method for attaching a vehicle leveling system to a vehicle is also disclosed. The example method includes providing a jack having an upper portion, a lower portion extendible with respect to the upper portion, and a mount fixed to the upper portion. The example method additionally includes providing a first frame engaging bracket, a second frame engaging bracket, a first spacer, a second spacer, a first fastener, and a second fastener. The first frame engaging bracket, the mount, the first spacer, the second spacer, and the second frame engaging bracket are coupled together with the first fastener and the second fastener. The first frame engaging bracket, the mount, the first spacer, the second spacer, the second frame engaging bracket, the first fastener, and the second fastener are positioned adjacent the frame of the vehicle, with a bottom surface of the frame of the vehicle on supporting surfaces of the first frame engaging bracket and the second frame engaging bracket. The example method additionally includes securing a portion of the first frame engaging bracket to an adjacent structure of the vehicle. Optionally, the method additionally includes securing a portion of the second frame engaging bracket to an adjacent structure of the vehicle. The steps of the example method can be performed in any order. For example, one or more of the components may be assembled together before positioning the components with respect to the vehicle frame. As another example, the components can be assembled together sequentially, as each component is brought into position relative to the frame of the vehicle.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing leveling jacks and a method of installing such leveling jacks onto a vehicle, without drilling new holes into the frame of the vehicle or otherwise permanently modifying the vehicle frame, particularly in "no-drill" zones. In the following description, numerous specific details are set forth (e.g., vehicle frame, vehicle type/layout, etc.) in order to provide a thorough understanding of the invention. Those skilled in the art will recognize, however, that the invention may be practiced apart from these specific details. In other instances, details of wellknown leveling practices (e.g., jack placement, synchronization, power, etc.) and components (e.g., hydraulic systems, etc.) have been omitted, so as not to unnecessarily obscure the present invention.

Figure 1A:
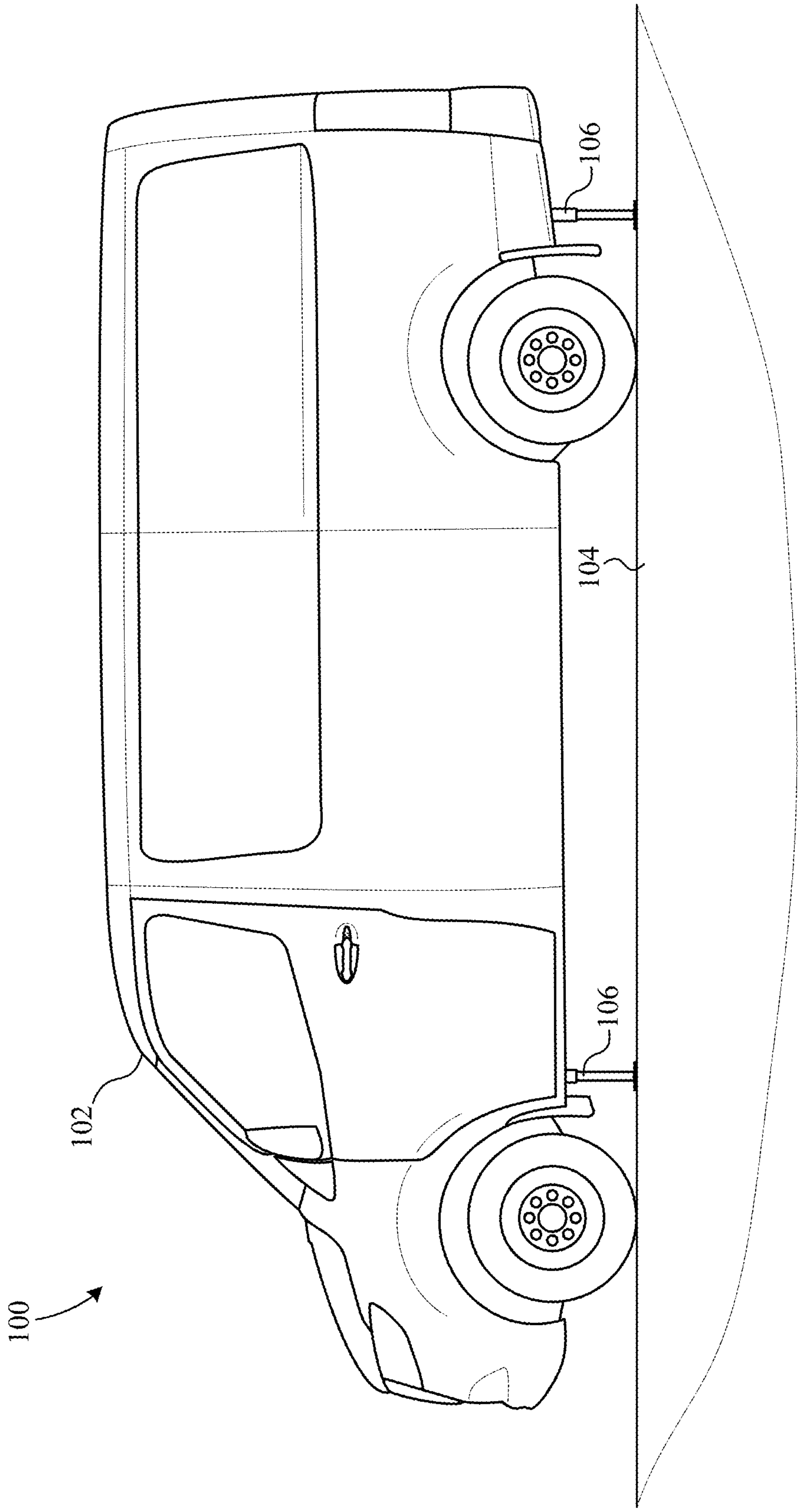
FIG. 1A is a side view of a utility vehicle being leveled/stabilized by a leveling system.

FIG. 1A shows a side view of a vehicle leveling system 100 leveling a utility vehicle 102 on solid ground 104, with jack assemblies 106. As shown, vehicle can be leveled and/or stabilized without raising the tires off of the ground by, for example, lifting just enough to take some of the weight off of the suspension system of vehicle 102. If necessary, however, the front and/or rear wheels can be lifted off of ground 104 when jack assemblies 106 are deployed. In this example, vehicle 102 is a Mercedes Sprinter 3500. However, the invention may be used, with little or no modification, on various different vehicle types (e.g., vans, trucks, cars, etc.), makes, and models.

Figure 1B:
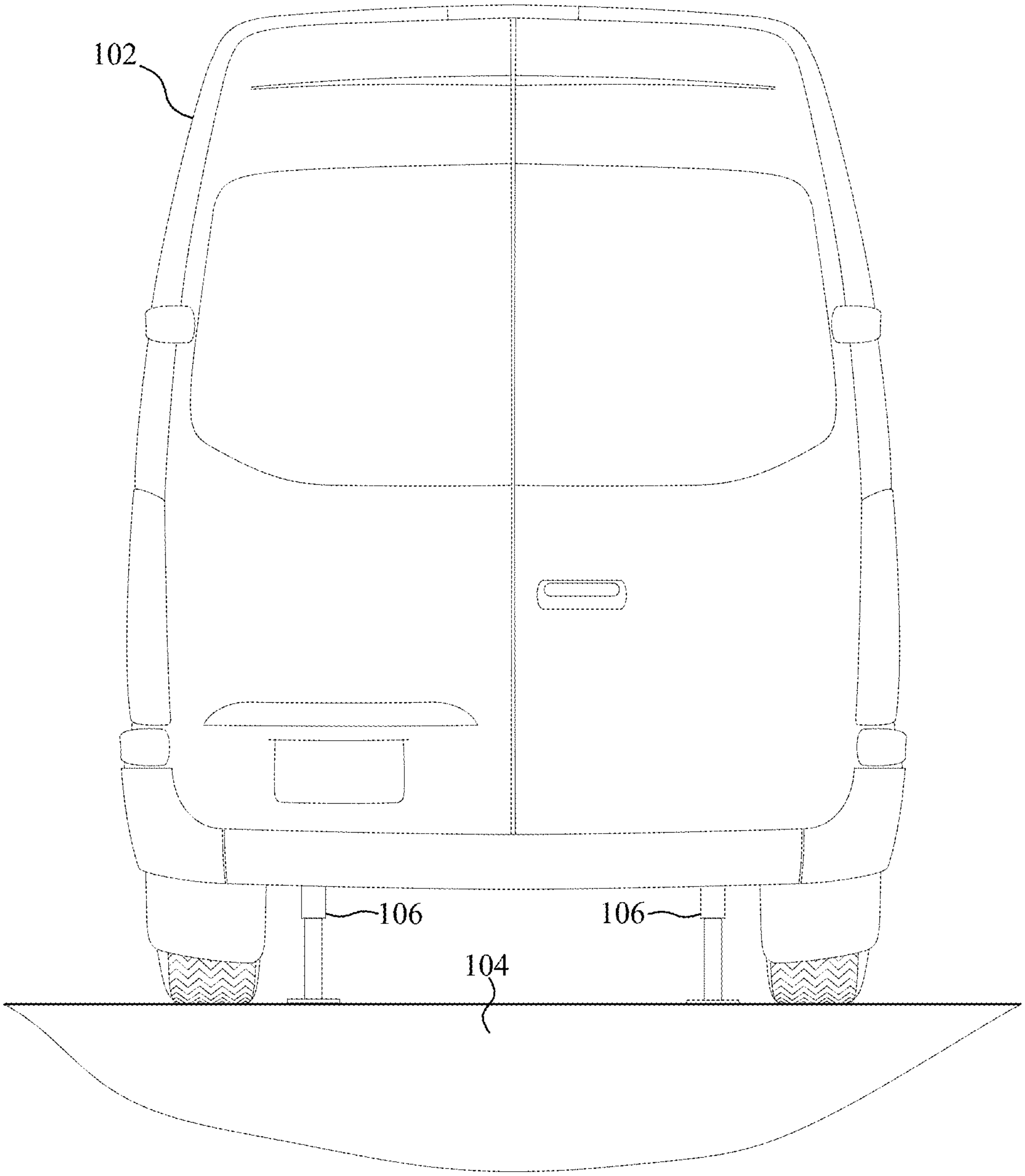
FIG. 1B is a rear view of the utility vehicle of FIG. 1A being leveled/stabilized with the leveling system of FIG. 1A.

FIG. 1B shows a rear view of system 100 with vehicle 102 being leveled on solid ground 104. In the view of FIG. 1B, only the rear jack assemblies 106 are shown. Depending on alignment, front jack assemblies 106 may or may not be visible, but are omitted from the view of FIG. 1B to avoid confusion.

Figure 2:
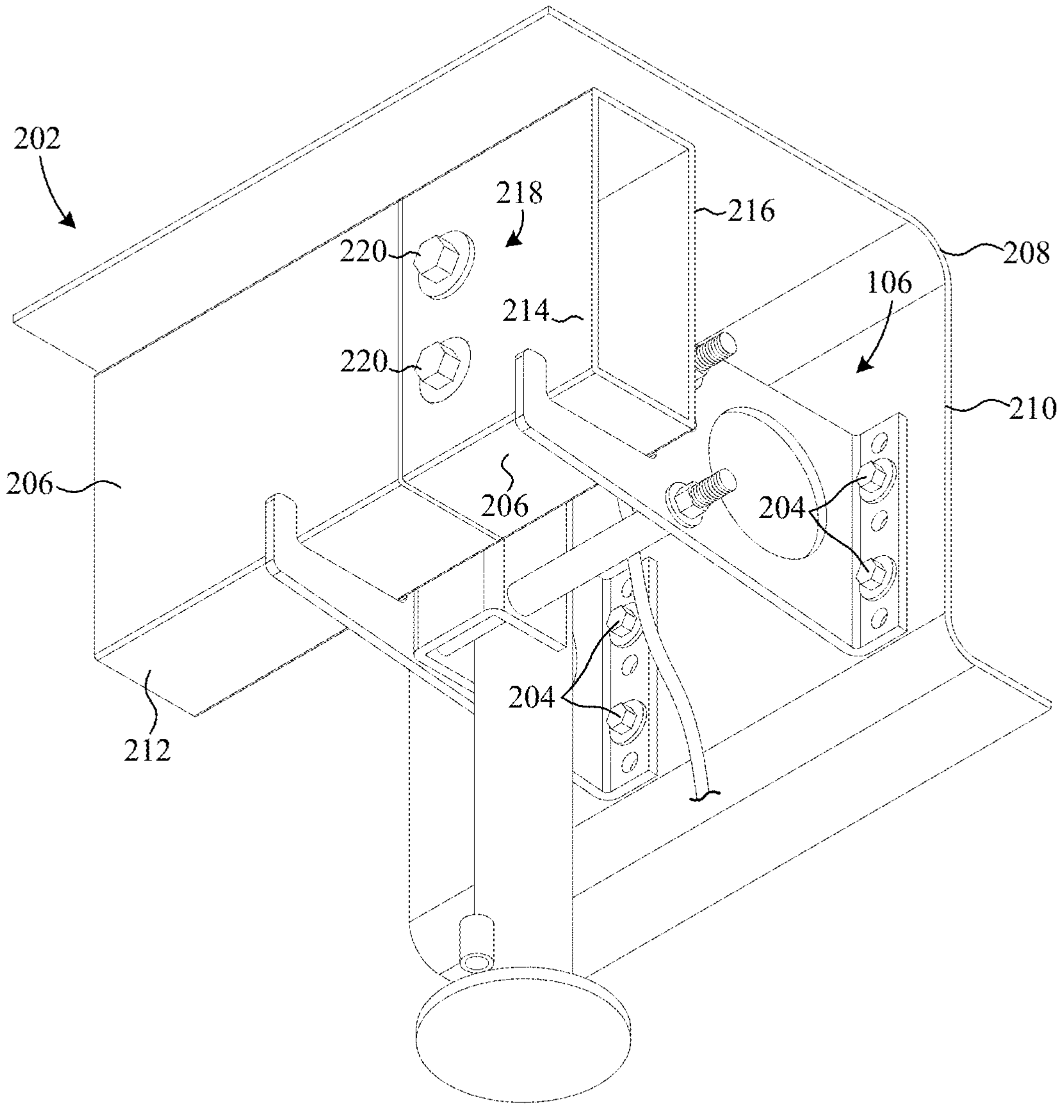
FIG. 2 is a bottom perspective view of a jack assembly of the vehicle leveling system of FIG. 1A mounted to the utility vehicle of FIG. 1A.

FIG. 2 is a perspective view of a jack assemblies 106, of vehicle leveling system 100, mounted to a section 202 of vehicle 102, via a set of bolts 204. Section 202 includes a portion of a frame rail 206 disposed under, and adjacent to, a floor panel 208. Frame rail 206 includes two rectangular tubular structures fastened together.

Jack assembly 106 is mounted to a side structure which, in this example, is a vertical planar portion of floor panel 108 that defines a stepped region 210 of section 202. Jack assembly 106 cradles the bottom of frame 206. Specifically, jack assembly 106 engages a bottom surface 212, a first side surface 214, and a second side surface 216 of frame 206. Upon actuation, jack assembly 106 urges upward against bottom surface 212 of frame 206, thereby lifting vehicle 102. As shown, jack assembly 106 engages frame 206, while avoiding an obstruction 218 presented by a portion of frame 206. In this example, obstruction 218 is depicted as a joint, at which two frame portions of frame 206 are bolted together via a set of nut and bolt assemblies 220. However, jack assembly 106 is configured to also avoid other types of frame obstructions such as, for example, fuel lines, brake lines, electrical boxes, frame flanges, and so on.

As will be shown and described in greater detail with reference to later figures, jack assembly 106 is transitionable between a stowed position (shown in FIG. 2) and a deployed position (shown in FIG. 6*b*). When the host vehicle 102 is being driven, jack assembly 106 is in the stowed position, wherein the jack is retracted to avoid road hazards. When vehicle 102 is parked, jack assembly 106 can be in the deployed position, wherein the jack is extended to engage the ground or other supporting surface.

Figure 3:
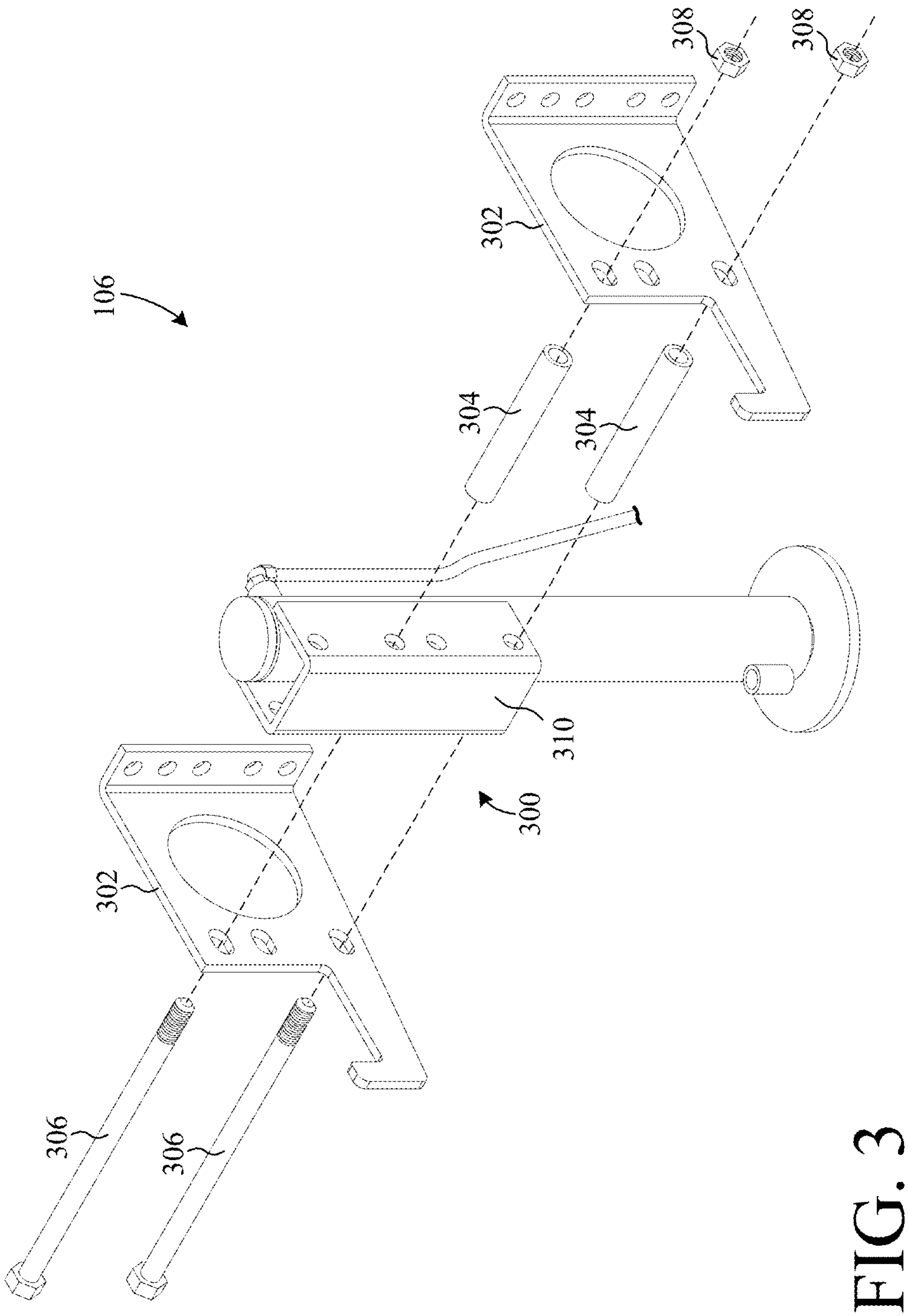
FIG. 3 is an exploded perspective view of the jack assembly of FIG. 2.

FIG. 3 shows an exploded perspective view of one of jack assemblies 106 of leveling system 100, which includes a jack 300, a set of frame engaging brackets 302, a set of spacers 304, a set of bolts 306, and a set of nuts 308. During assembly of jack 106, bolts 306 are inserted through a first one of brackets 302, a jack mount 310, spacers 304, a second one of brackets 302, and then each of nuts 308 is tightened onto a respective one of bolts 308.

Figure 4:
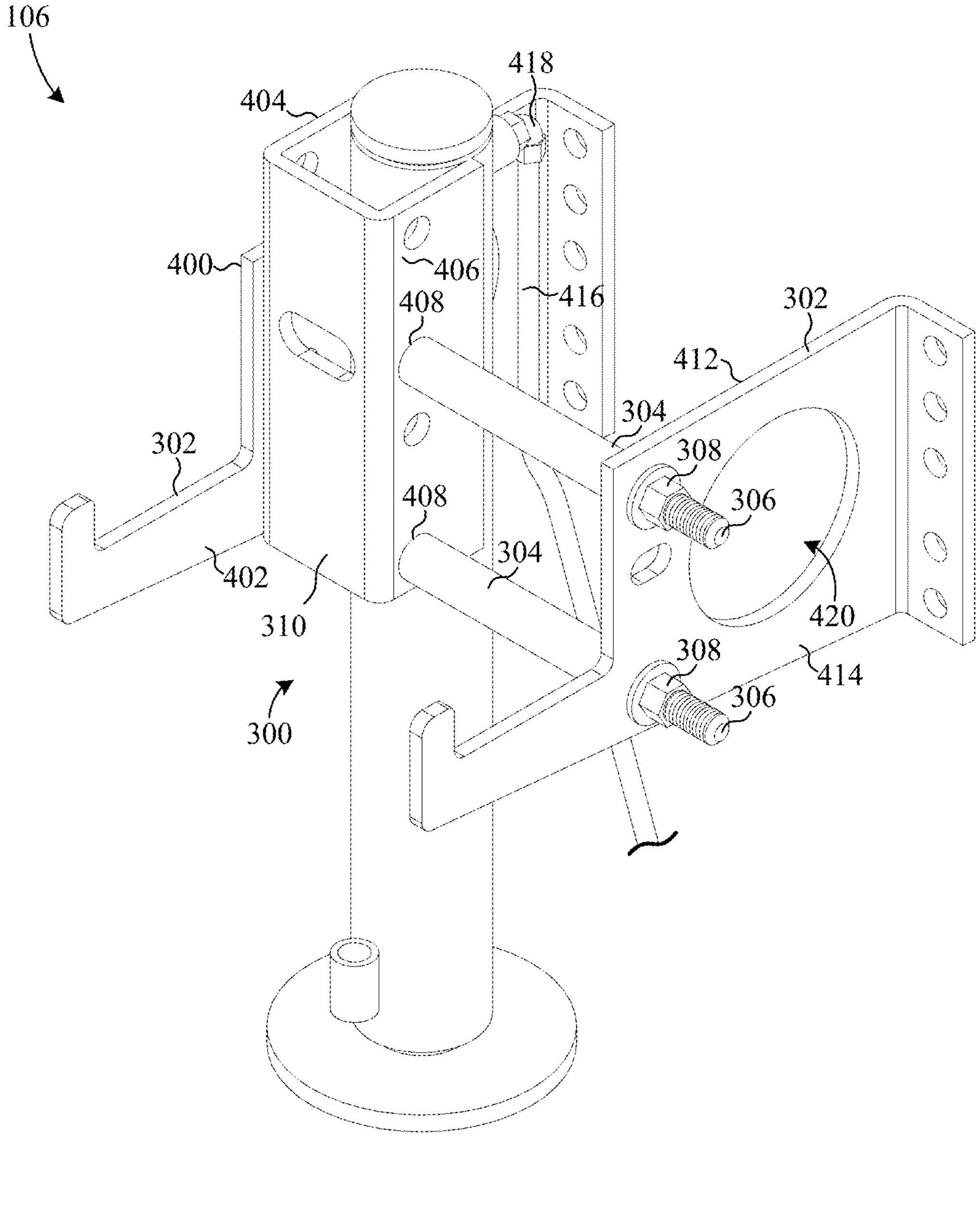
FIG. 4 is a perspective view showing one side of the jack assembly of FIG. 3 assembled.

FIG. 4 shows a perspective view of jack assembly 106 of leveling system 100, in the stowed position, vehicle section 202 removed for a clearer view. When nuts 308 are tightened onto bolts 306, the heads (visible in FIG. 3) of bolts 306 are urged against the outside surface 400 of the first bracket 302. The opposite inside surface 402 of the first bracket 302 is urged against one side surface 404 of jack assembly 300, and the opposite side surface 406 of jack assembly 300 is urged against by first sides 408 of spacers 304. The opposite second sides 410 (visible in FIG. 12) of spacers 304 are urged against a first side 412 of the second bracket 302, and nuts 308 (with washers) are urged against the second side 414 of the second bracket 302.

In this particular example, the components directly abut one another. However, as an option, the components can indirectly abut one another by, for example placing a pad or the like between adjacent components. For example, an anti-noise polymeric film could be disposed between bracket 302 and jack mount 310, such that bracket 302 would indirectly abut jack mount 310 through such film.

A hydraulic hose 416, a hydraulic fitting 418, and bolts 204 (shown in FIG. 2) are located behind jack assembly 300 and are easily accessible from underneath and between brackets 302 and/or directly through large passages 420 formed in brackets 302. This accessibility allows a user to get their hands and/or tools (e.g. wrench) on these components without having to remove jack assembly 106 from the vehicle. Openings 420 may also provide a passageway through which hydraulic hose 416 can be routed to, for example, a hydraulic pump, manifold, reservoir, etc. Furthermore, openings 420 also reduce the overall weight of jack assembly 106. In this example, opening 420 is an enclosed aperture completely bound by bracket 302. Optionally, brackets 302 may define a non-enclosed passageway such as, for example, a notch, a slot, and so on.

Figure 5:
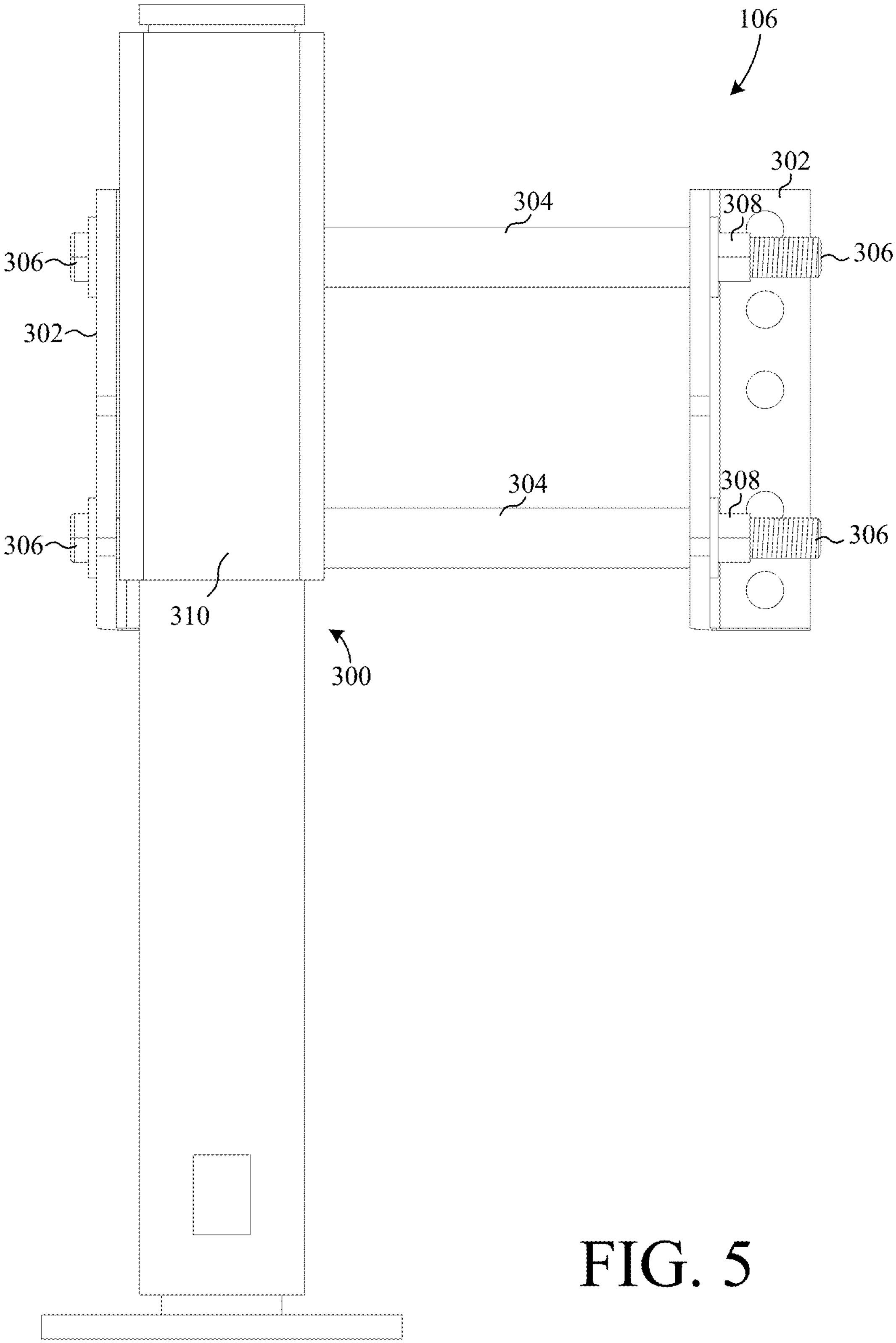
FIG. 5 is a front plan view showing part of the jack assembly of FIG. 4.

FIG. 5 is a side plan view of one of jack assemblies 106 of leveling system 100 in the stowed position. Spacers 304 are slightly longer than twice the horizontal width of the upper portion of jack 300. The lengths of bolts 304 are greater than sum of the thickness of the first of bracket 302, the distance between surfaces 404 and 406 of jack 300, the length of spacer 304, and the thickness of second bracket 302.

Figure 6B:
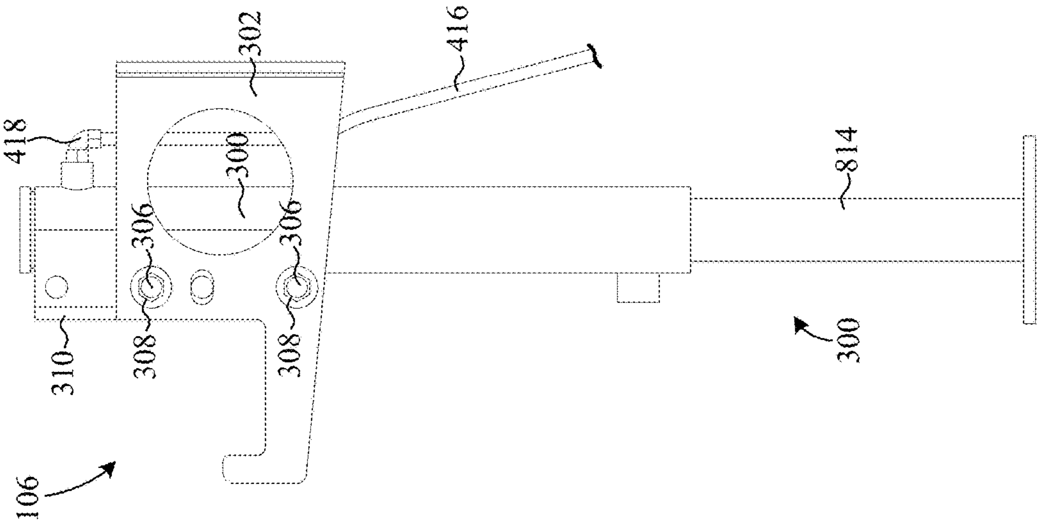
FIG. 6B is a side plan view of the jack assembly of FIG. 4, with the jack in a deployed position.
Figure 6A:
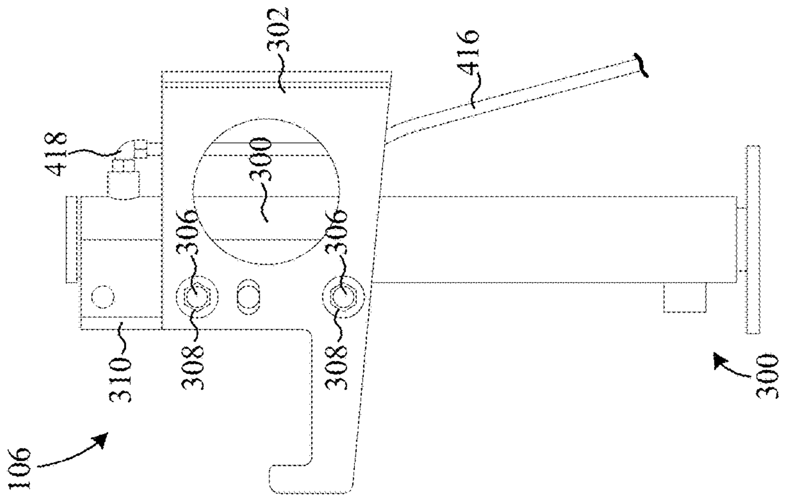
FIG. 6A is a side plan view of the jack assembly of FIG. 4, with the jack in a stowed position.

FIG. 6A is another side plan view of jack assembly 106 in the stowed position.

FIG. 6B is another side plan view of jack assembly 106 in a deployed position.

Figure 7:
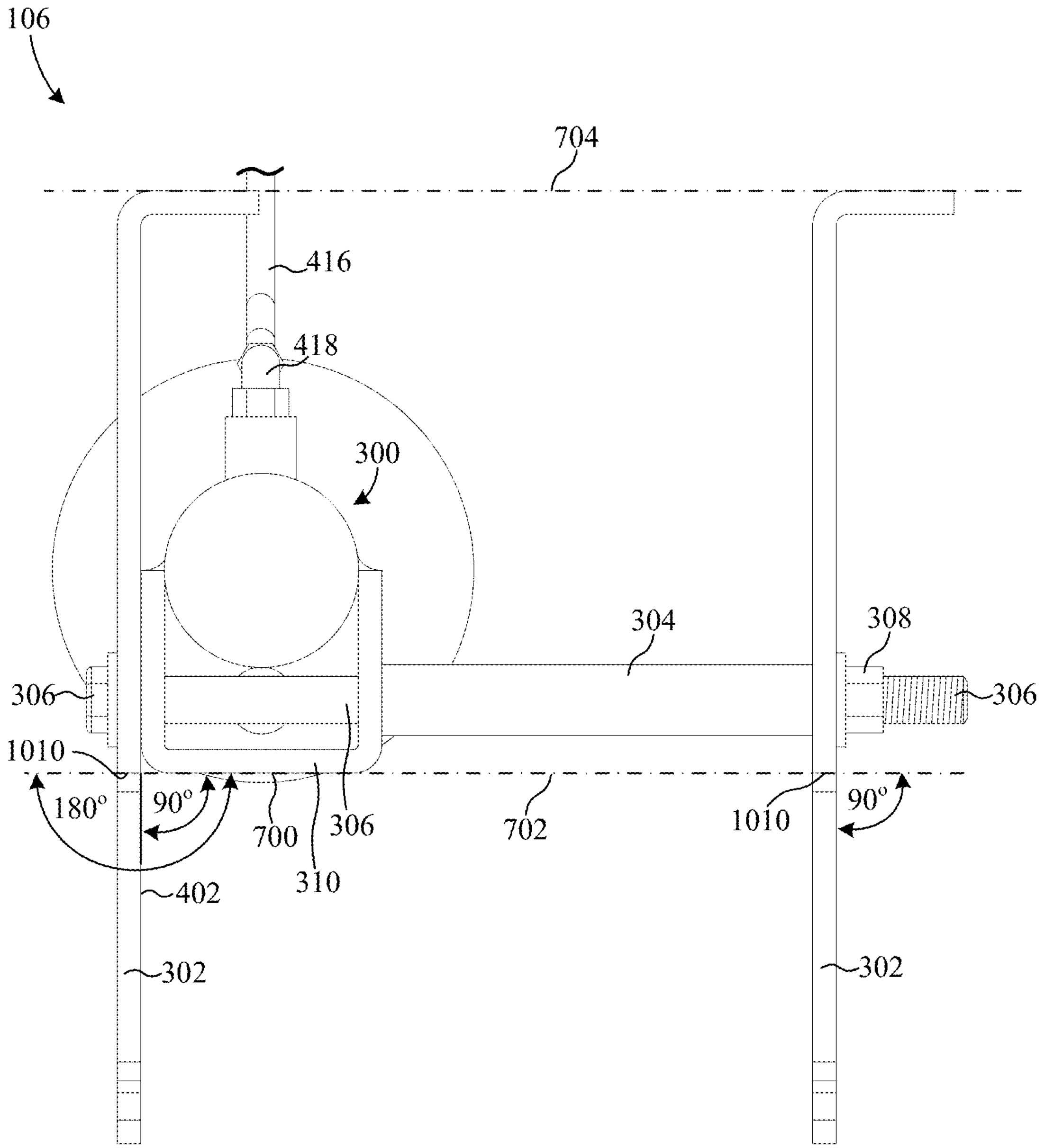
FIG. 7 is a top plan view of the jack assembly of FIG. 4.
Figure 8:
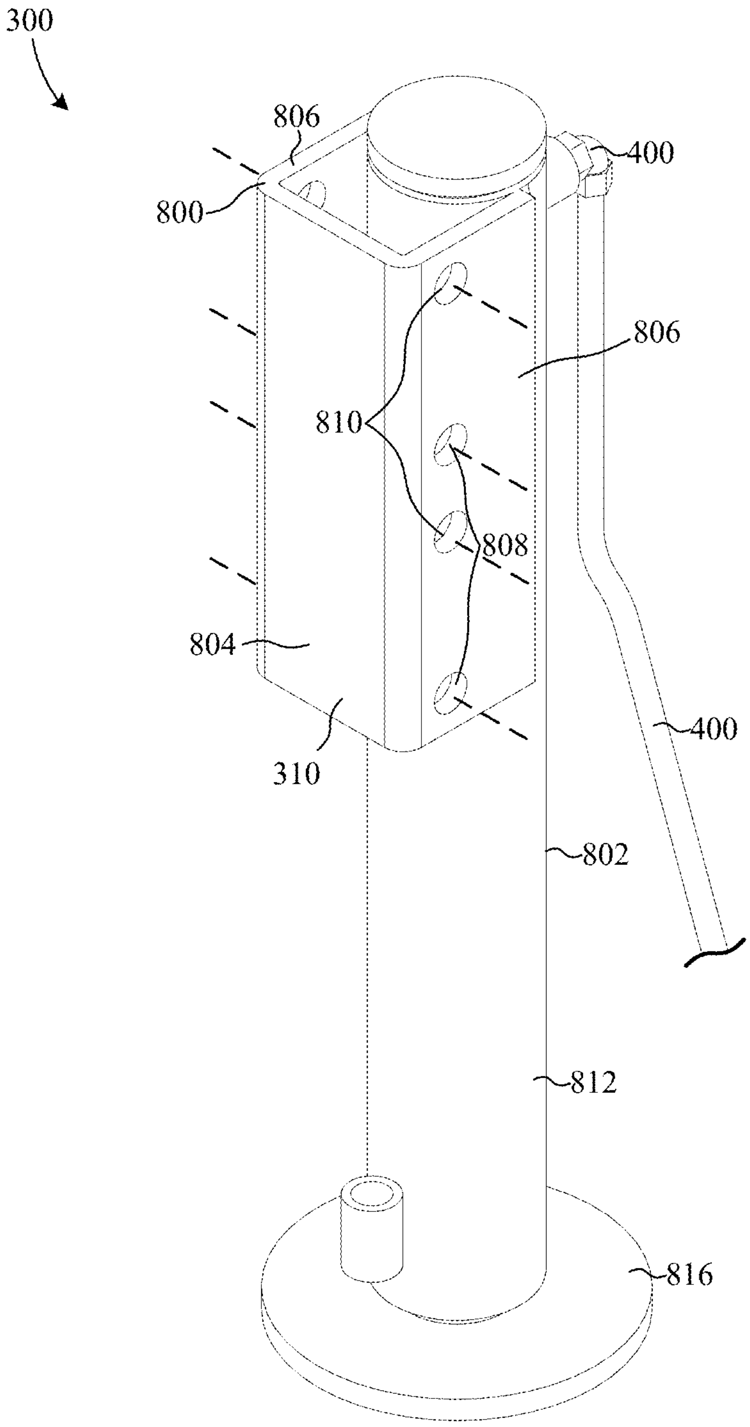
FIG. 8 is a front perspective view of the jack of the jack assembly of FIG. 4.

FIG. 7 is a top plan view of jack assembly 106, which shows that the angle between the flat medial surface 700 of jack assembly 300 and the flat inside surface 402 of the first bracket 302 is ninety degrees. When jack assembly 106 is mounted to vehicle 102, surface 700 abuts the side surface of frame 206. As indicated by the 180 degree double-ended arrow, surface 700 and surface 1010 (shown in FIG. 10) are substantially coplanar, in a plane 702. Further, plane 702 is parallel to a plane 704, wherein the rear planar surfaces 706 of securement tab 1012 are disposed. FIG. 8 is a front perspective view of jack 300, wherein jack mount 310 includes a C-channel bracket 800 welded to a hydraulic cylinder 802. Bracket 800 is a section of steel, C-shaped stock that includes an intermediate wall 804 disposed perpendicularly between two sidewalls 806. Each sidewall 806 includes a first set of apertures 808 and a second set of apertures 810. Apertures 808 in the first sidewall 806 are coaxially aligned with apertures 810 in the second sidewall 806. Likewise, apertures 810 in the first sidewall 806 are coaxially aligned with apertures 810 in the second sidewall. Apertures 808 allow bolts 306 to pass through bracket 800 when jack assembly 300 is mounted in a first, high position (shown in FIG. 2) with respect to brackets 302. Optionally, bolts 306 may instead be passed through respective apertures 810 to mount jack assembly 300 in a second, low position (not shown) with respect to bracket 302. Accordingly, the distance between apertures 808 is the same as the distance between apertures 810. The distance between the sidewalls 806 of C-channel bracket 800 is approximately the same as (or slightly less than) the outer diameter of the upper portion 812 of hydraulic cylinder 802, such that the open ends of sidewalls 806 contact the outer surface of upper portion 812 and are welded thereto.

Hydraulic cylinder 802 includes upper portion 812 and a lower portion 814. Upper portion 812 is welded to bracket 800 and connected to hose 400 via fitting 402. Lower portion 814 (shown in FIG. 6B) is extendable out of upper portion 812 and includes a foot structure 816 that is configured to engage the ground when leveling system is deployed.

Figure 9:
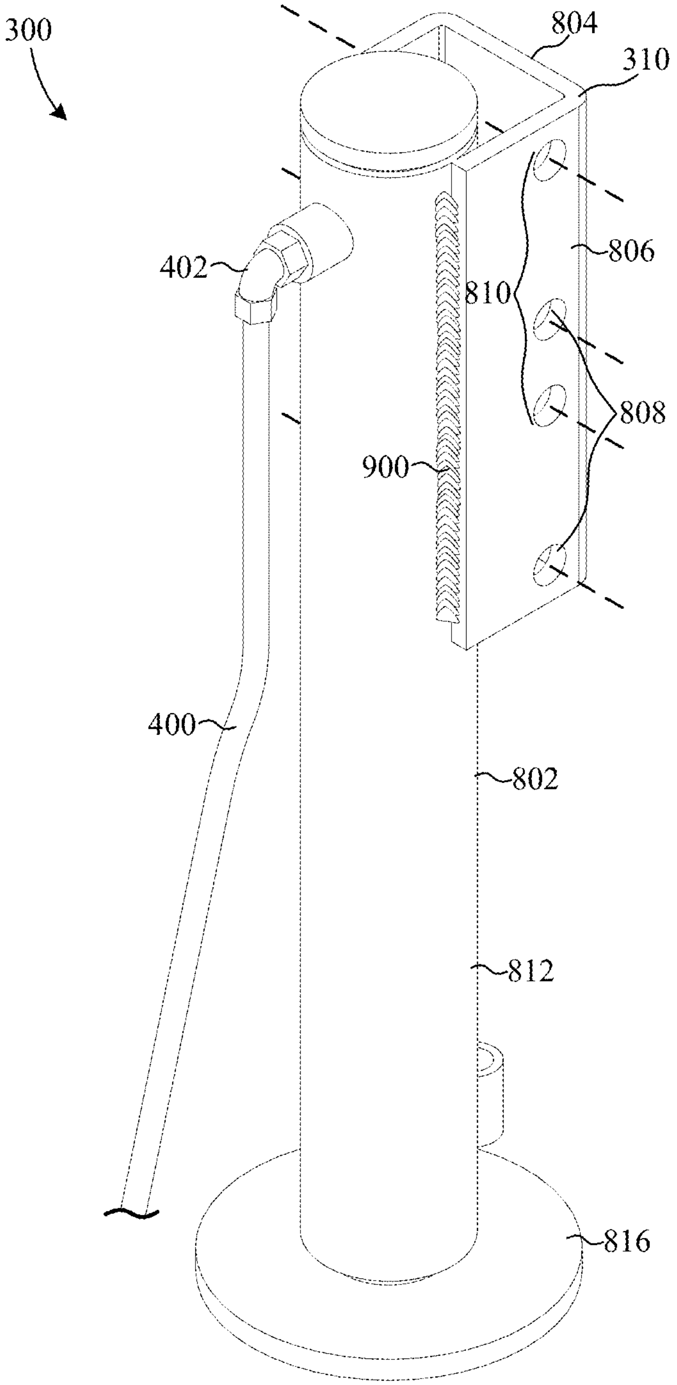
FIG. 9 is a rear perspective view of the jack of the jack assembly of FIG. 4.

FIG. 9 shows a rear perspective view of jack assembly 300 in a stowed position. As previously mentioned, bracket 800 is attached to upper portion 812 via two weld lines 900 (only one visible).

Figure 10:
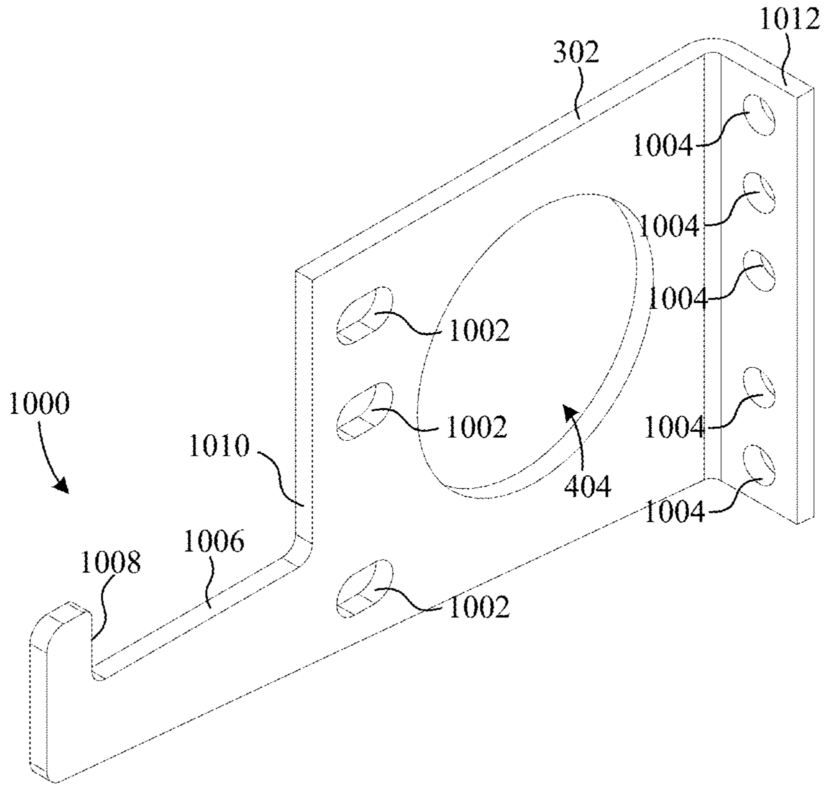
FIG. 10 is a front perspective view of a bracket of the jack assembly of FIG. 4.

FIG. 10 shows a perspective view of one of brackets 302, which includes a hook (or cradle) feature 1000, a set of elongated apertures 1002, a set of round apertures 1004, and access opening 404. Hook feature 1000 is configured to engage the exterior surface of a vehicle frame on three of its four sides. Hook feature 1000 is defined by a lower surface 1006, a first side surface 1008, and a second side surface 1010. Surfaces 1008 and 1010 are substantially parallel to one another, and both are substantially perpendicular to surface 1006. Lower surface 1006 is configured to engage the bottom surface of a frame and support the weight of vehicle 102. Side surfaces 1008 and 1010 are configured to closely face opposing sidewalls of the frame to prevent relative lateral movement between the frame 206 and bracket 302. Elongated apertures 1002 provide a passageway through which bolts 306 pass through bracket 302. The elongation of apertures 1002 allows the position of bracket 302 with respect to bolts 306 to be adjusted slightly before bolts 306 are tightened, so that surface 804 can be positioned against the outside sidewall 216 of frame 206. There are more elongated apertures 1002 than the number of bolts 306 to allow different configurations such as, for example, a third bolt 306 or to allow the position of bolts 306 to be changed. Round apertures 1004 are formed on securement tab 1012 of bracket 302 to receive bolts 204 in various optional configurations. For example, two, three, four, or five bolts 204 or screws may be used to attach bracket 302 to a vehicle side structure 210. Apertures 1004 extend in a direction that is perpendicular to the direction that apertures 1002 and opening 404 extend. In this example, bracket 302 is formed from a piece of sheet metal that is cut and bent into shape.

Figure 11:
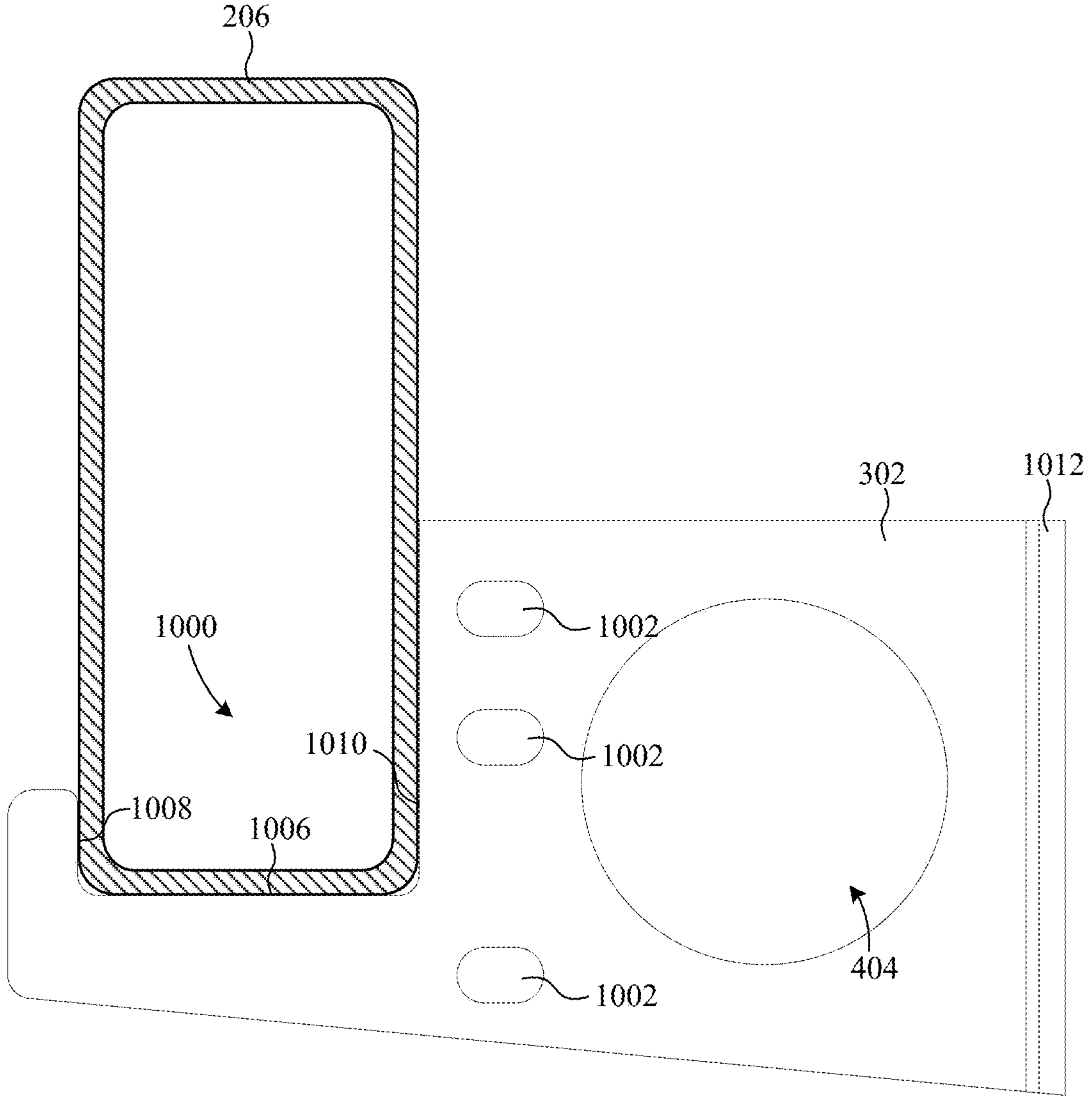
FIG. 11 is a side plan view of the bracket of FIG. 10 engaging the vehicle frame shown in FIG. 2.

FIG. 11 shows a side plan view of one of brackets 302 cradling frame 206.

Figure 12:
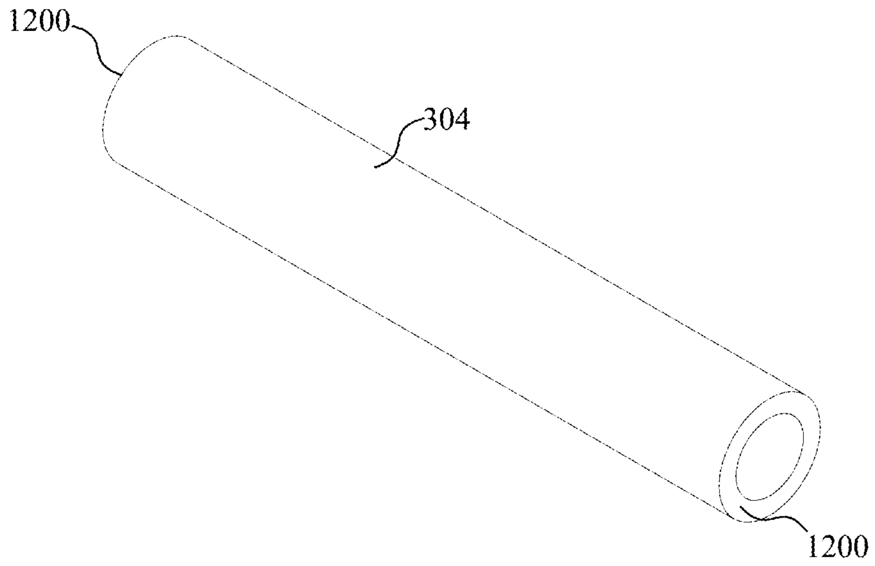
FIG. 12 is a perspective view of a spacer of the jack assembly of FIG. 4.

FIG. 12 shows a perspective view of one of spacers 304 which, in this example, is a simple tubular steel structure with two planar ends 1200. The space between brackets 302 can be changed by changing the length of spacers 304 and, if needed, bolts 306. In this manner, appropriately sized spacers and bolts can be selected to avoid one or more obstacles presented in a particular situation.

Figure 13:
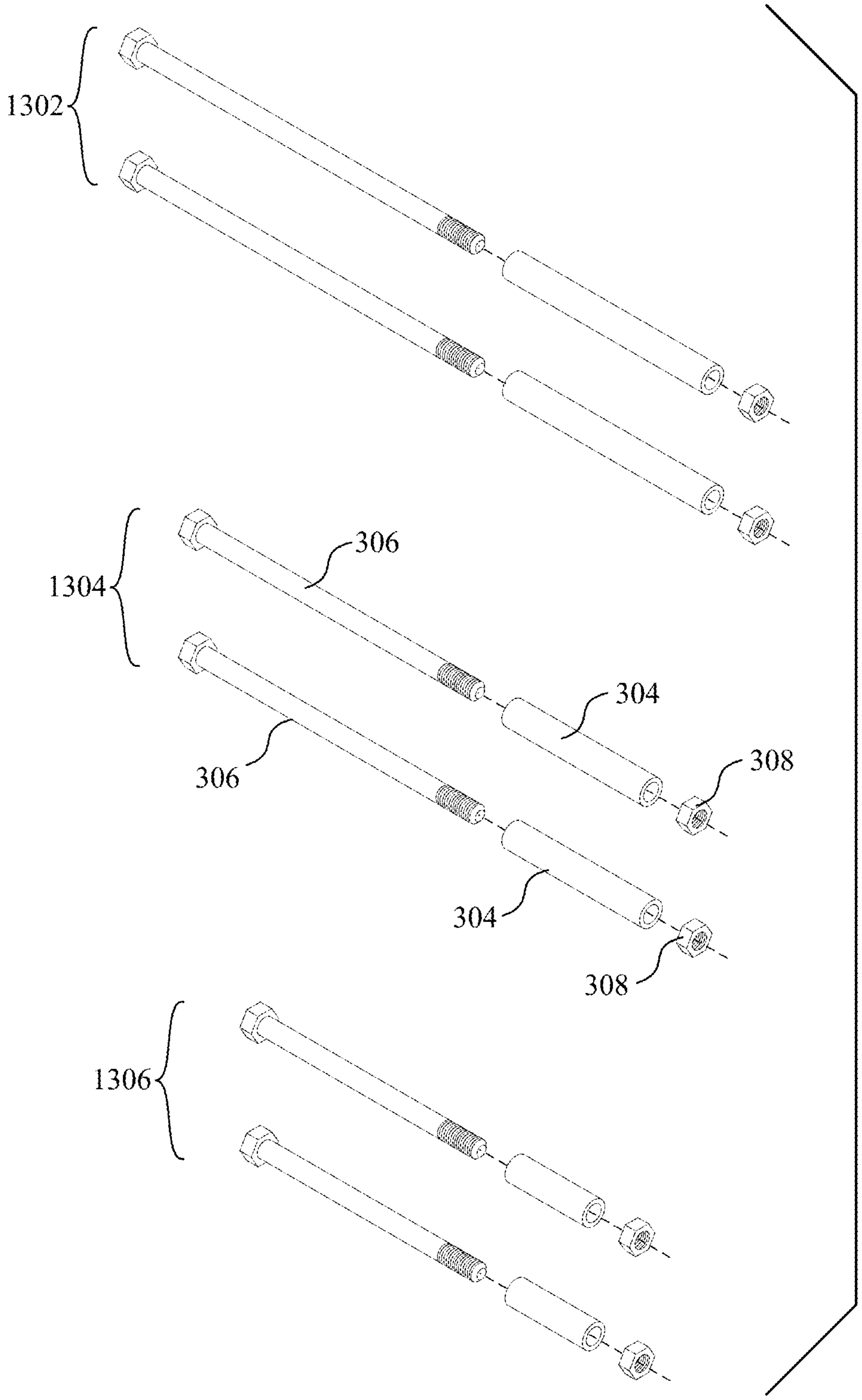
FIG. 13 is a perspective view of a spacer kit that can be used to adjust the jack assembly of FIG. 4.

FIG. 13 is a perspective view of a spacer kit that includes three sets of spacers/fasteners 1302, 1304, and 1306. Set 1304 includes spacers 304, bolts 306, and nuts 308. Sets 1302 and 1304 include spacers/fasteners that are longer and shorter, respectively, than spacers 304 and bolts 306. The provision of spacers/fasteners of varying lengths provides options for dealing with different applications and/or obstructions. Although only three sets of spacers/fasteners are shown by way of example, additional sets having different lengths will provide even more flexibility when faced with unforeseen obstacles.

Figure 14:
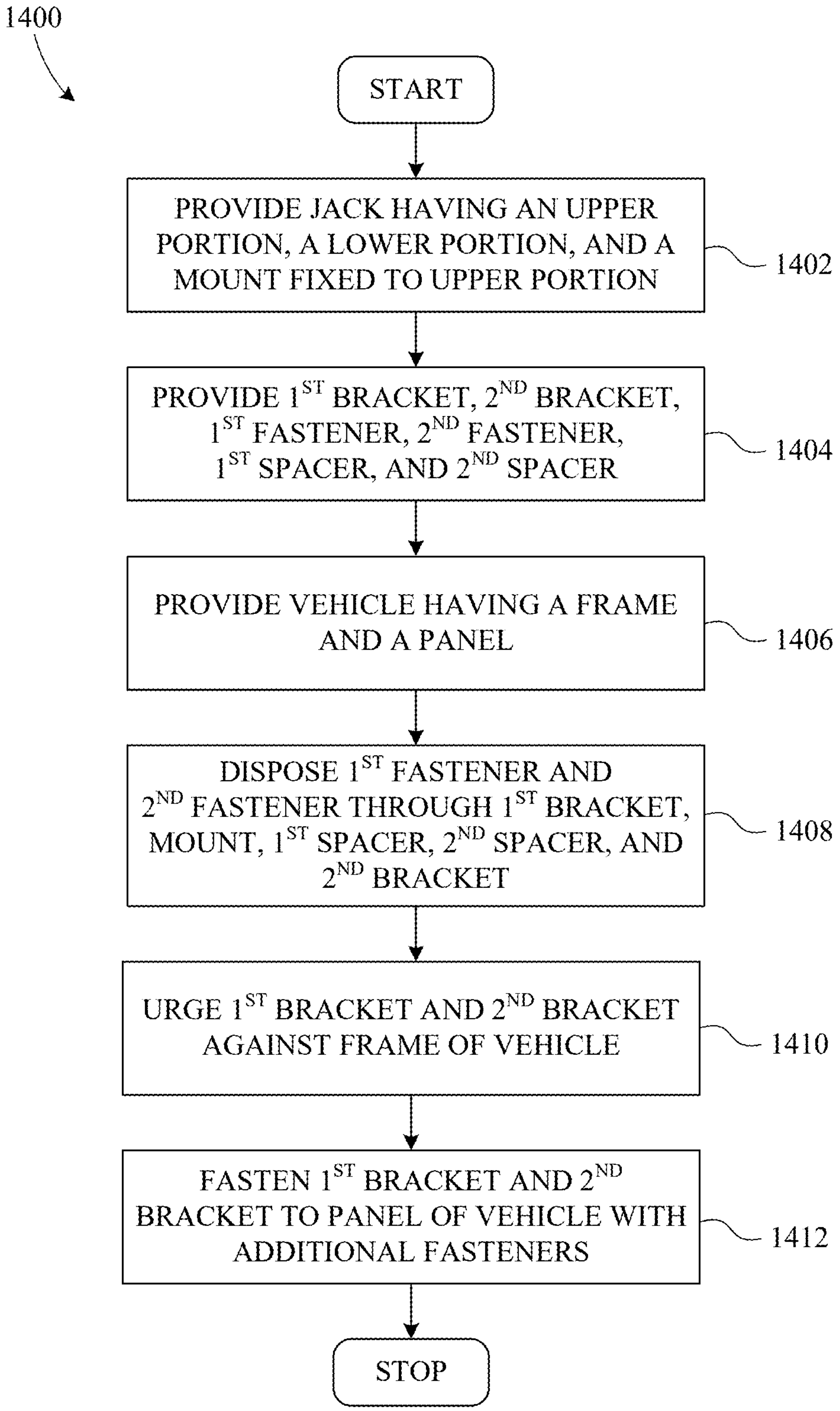
FIG. 14 is a flowchart summarizing an example method for installing the jack assembly of FIG. 4.

FIG. 14 is a flowchart summarizing a method for installing jack assembly 106 on vehicle 102. In a first step 1402, a jack having an upper portion, a lower portion and a mount fixed to the upper portion is provided. In a second step 1404, a first bracket, a second bracket, a first fastener, a second fastener, a first spacer, and a second spacer are provided. Then, in a third step 1406, a vehicle having a frame and a panel is provided. In a fourth step 1408, the first fastener and the second fastener are disposed through the first bracket, the jack mount, the first spacer, the second spacer, and the second bracket. In a fifth step 1410, the first bracket and the second bracket are urged against the frame of the vehicle. Then, the first bracket and the second bracket are fastened to the panel of the vehicle with additional fasteners. Steps of method 1400 can be performed serially, in parallel, or in a different order than presented here.

The description of particular embodiments of the present invention is now complete. Many of the described features may be substituted, altered or omitted without departing from the scope of the invention. For example, alternate number of spacers and bolts (e.g. three spacers and three bolts), may be substituted for the two spacers and two bolts shown in the example. As another example, alternate length spacers and bolts may be used. For example, a kit including a plurality of different length spacers can be provided with the bracket(s). As yet another example, all of the jack assemblies 106 do not necessarily need to include the spacers. For example, a jack assembly 106 including spacers 304 can be mounted on the front passenger side of vehicle 102, and a jack assembly 106', modified by removing spacers 304, can be mounted on the front driver side of vehicle 102, or vice versa. These and other deviations from the particular embodiments shown will be apparent to those skilled in the art, particularly in view of the foregoing disclosure.

I claim:

1. A vehicle leveling system for attachment to a vehicle, said vehicle leveling system comprising:

a first jack including an upper portion and a lower portion, said lower portion extendable with respect to said upper portion;

a mount fixed to said upper portion of said jack;

a first frame engaging bracket including an intermediate portion, a support arm, and a securement tab, said support arm extending from a first side of said intermediate portion and being configured to engage a bottom surface of said vehicle frame, said securement tab disposed to facilitate securement of said first frame engaging bracket to an adjacent structure of said vehicle;

a second frame engaging bracket including an intermediate portion, a support arm, and a securement tab, said support arm extending from a first side of said intermediate portion and being configured to engage said bottom surface of said vehicle frame, said securement tab disposed to facilitate securement of said first frame engaging bracket to an adjacent structure of said vehicle;

a spacer disposed between said mount and said second frame engaging bracket; and a fastener coupling said first frame engaging bracket, said mount, said spacer, and said second frame engaging bracket together.

2. The vehicle leveling system of claim 1, wherein:
said securement tab of said first frame engaging bracket includes a substantially vertical planar surface defining at least one fastener receiving aperture.

3. The vehicle leveling system of claim 1, wherein:
said spacer is an elongated structure that includes a first end disposed to abut a first side of said mount; and
said spacer includes a second end disposed to abut said second frame engaging bracket.

4. The vehicle leveling system of claim 3, wherein:
said first frame engaging bracket defines a first aperture;
said second frame engaging bracket defines a second aperture;
said mount defines a third aperture;
said first spacer defines a bore; and
said fastener is disposed through said first aperture, said second aperture, said third aperture, and said bore.

5. The vehicle leveling system of claim 4, further comprising:
a second spacer, said second spacer being an elongated structure having a first end and a second end, and defining a bore; and
a second fastener; and wherein:
said second spacer is disposed between said mount and said second frame engaging bracket;
said first frame engaging bracket defines a fourth aperture;
said second frame engaging bracket defines a fifth aperture;
said mount defines a sixth aperture; and
said second fastener is disposed through said fourth aperture, said fifth aperture, said sixth aperture, and said bore of said second spacer.

6. The vehicle leveling system of claim 4, wherein:
said first aperture is an elongated slot facilitating horizontal adjustment of said first frame engaging bracket with respect to said first fastener; and
said second aperture is an elongated slot facilitating horizontal adjustment of said second frame engaging bracket with respect to said first fastener.

7. The vehicle leveling system of claim 6, wherein:
said mount includes an upright surface disposed to abut a sidewall of a frame of said vehicle; and
said third aperture is substantially circular.

8. The vehicle leveling system of claim 3, wherein:
said first jack is a hydraulic jack;
said upper portion of said first jack includes a hydraulic line connector;
said first jack includes a hydraulic fluid line coupled to said hydraulic line connector; and
at least a portion of said hydraulic fluid line is disposed between said first frame engaging bracket and said second frame engaging bracket.

9. The vehicle leveling system of claim 3, wherein:
said spacer extends along a first axis;
said securement tab defines a fastener receiving aperture extending therethrough along a second axis; and
said first axis is perpendicular to said second axis.

10. The vehicle leveling system of claim 1, wherein at least one of said intermediate portion of said first frame engaging bracket and said intermediate portion of said second frame engaging bracket defines an access passageway through which tools can pass to access a space between said first frame engaging bracket and said second frame engaging bracket from outside of said first frame engaging bracket and said second frame engaging bracket.

11. The vehicle leveling system of claim 10, wherein said passageway is a through-hole passing through said intermediate portion of said first frame engaging bracket.

12. The vehicle leveling system of claim 1, wherein:
said intermediate portion and said support arm are substantially flat and aligned with a first plane;
said securement tab is substantially flat and aligned with a second plane; and
said first plane is perpendicular to said second plane.

13. The vehicle leveling system of claim 12, wherein said intermediate portion, said support arm, and said securement tab are integral parts of a single piece of plate metal.

14. The vehicle leveling system of claim 12, wherein said support arm further defines a first side surface extending upward from a first end of said supporting surface, said first side surface disposed to engage a side wall of a vehicle frame.

15. The vehicle leveling system of claim 1, wherein:
said mount includes a substantially flat first upright surface;
said first upright surface abuts said intermediate portion of said first frame engaging bracket;
said mount includes a substantially flat second upright surface perpendicular to said first upright surface; and
said second upright surface is disposed to abut a sidewall of a frame of said vehicle.

16. The vehicle leveling system of claim 15, wherein:
said upper portion of said first jack includes a hydraulic cylinder barrel;
said mount includes a section of metal C-channel having a first sidewall, a second sidewall, and an intermediate sidewall interposed between said first sidewall and said second sidewall;
said first sidewall is attached to said hydraulic cylinder barrel;
said second sidewall is attached to said hydraulic cylinder barrel;
said first sidewall is substantially parallel to said second sidewall;
said intermediate sidewall is substantially perpendicular to said first sidewall and said second sidewall;
said first upright surface is an integral part of said first sidewall of said section of metal C-channel; and
said second upright surface is an integral part of said intermediate sidewall of said section of metal C-channel.

17. The vehicle leveling system of claim 16, further comprising:
a second spacer; and
a second fastener; and wherein said first frame engaging bracket defines a first aperture and a second aperture;
said first sidewall of said section of metal C-channel defines a third aperture and a fourth aperture;
said second sidewall of said section of metal C-channel defines a fifth aperture and a sixth aperture;
said second frame engaging bracket defines seventh aperture and an eighth aperture;
said first spacer is an elongated structure defining a first bore;
said second spacer is an elongated structure defining a second bore;
said first fastener is disposed through said first aperture, said third aperture, said fifth aperture, said first bore, and said seventh aperture; and
said second fastener is disposed through said second aperture, said fourth aperture, said sixth aperture, said second bore, and said eighth aperture.

18. The vehicle leveling system of claim 1, wherein said first frame engaging bracket is formed from a single piece of substantially flat metal having a bend formed therein between said securement tab and said intermediate portion.

19. The vehicle leveling system of claim 1, wherein said second frame engaging bracket is geometrically identical to said first frame engaging bracket.

20. A method for attaching a vehicle leveling system to a vehicle, said method comprising:

providing a jack having an upper portion, a lower portion extendible with respect to said upper portion, and a mount fixed to said upper portion;

providing a first frame engaging bracket, a second frame engaging bracket, a first spacer, a second spacer, a first fastener, and a second fastener;

coupling said first frame engaging bracket, said mount, said first spacer, said second spacer, and said second frame engaging bracket together with said first fastener and said second fastener;

positioning said first frame engaging bracket, said mount, said first spacer, said second spacer, said second frame engaging bracket, said first fastener, and said second fastener adjacent said frame of said vehicle, with a bottom surface of said frame of said vehicle on supporting surfaces of said first frame engaging bracket and said second frame engaging bracket; and securing a portion of said first frame engaging bracket to an adjacent structure of said vehicle; and securing a portion of said second frame engaging bracket to an adjacent structure of said vehicle.

* * * * *